United States Patent [19]

Batson et al.

[11] Patent Number: 5,158,843

[45] Date of Patent: Oct. 27, 1992

[54] SMALL PARTICLE THIN ELECTROCHEMICAL ELECTRODE AND METHOD

[76] Inventors: David C. Batson, 25 Adams Ct., Amesbury, Mass. 01913; Franz Goebel, 20 Musket La., Sudbury, Mass. 01776; Peter B. Harris, 89 Lowell Dr., Stow, Mass. 01775; Peter F. Morello, 23 Foster Rd., Bedford, Mass. 01730

[21] Appl. No.: 548,455

[22] Filed: Jul. 2, 1990

[51] Int. Cl.$^5$ .................... H01M 4/58; H01M 4/96
[52] U.S. Cl. .................... 429/218; 429/209; 429/196; 429/101; 502/101
[58] Field of Search ............ 429/101, 196, 218, 209; 502/101

[56] References Cited

U.S. PATENT DOCUMENTS

| | | | |
|---|---|---|---|
| 3,940,326 | 2/1976 | Thomas et al. | 204/181.5 |
| 4,031,033 | 6/1977 | Budevski et al. | 502/101 |
| 4,090,978 | 5/1978 | Welsh et al. | 502/101 |
| 4,118,334 | 10/1978 | Goebel | 252/182.1 |
| 4,121,020 | 10/1978 | Epstein et al. | 429/196 |
| 4,296,187 | 10/1981 | Barnes et al. | 429/105 |
| 4,352,866 | 10/1982 | Klinedinst et al. | 429/101 |
| 4,562,094 | 12/1985 | Goebel et al. | 427/115 |
| 4,996,080 | 2/1991 | Daraktchiev | 427/240 |

*Primary Examiner*—Anthony McFarlane
*Attorney, Agent, or Firm*—Gerald B. Hollins; Donald J. Singer

[57] ABSTRACT

An electrochemical cell electrode such as the cathode element for a high energy density battery cell and its fabrication sequence are disclosed. Material such as finely-divided carbon particles is dispersed over the electrode surface during an ultrasonic energy assisted wet spraying process which produces very thin electrodes that are also low in fabrication cost and increased in uniformity and energy density capability. Fine particle material deposition on both a metal foil electrode and on an insulating member that is later joined to a metal foil electrode are contemplated.

25 Claims, 4 Drawing Sheets

SMALL PARTICLE THIN ELECTROCHEMICAL ELECTRODE AND METHOD

RIGHTS OF THE GOVERNMENT

The invention described herein may be manufactured and used by or for the government of the United States for all governmental purposes without the payment of any royalty.

BACKGROUND OF THE INVENTION

Newly emerging battery requirements such as are to be found in the Strategic Defense Initiative program and in battery-powered automobiles have recently focused considerable effort into the development of battery systems having larger energy and power density capabilities. The need for higher energy density has in particular urged battery development efforts toward ultra-thin cathode electrode assemblies. In the thin electrode art, however, it is found that one of the more difficult components to produce with small physical size and desirable consistency, accuracy, and low cost is a finely-divided particle or particle composite electrode structure. In such structures, finely-divided particulate matter such as carbon black, powdered nickel or other large surface area generating substances are however, needed for providing a desirable low electrical resistance interface with the battery electrolyte and for other benefits. Finely divided materials of this type have heretofore been somewhat difficult to control with respect to their layer thickness and region-to-region uniformity, for example, in an electrode assembly.

As is generally known in the electrical battery art, one class of useful arrangement for a battery cell involves the lithium thionyl chloride and lithium gallium chloride systems in which a liquid electrolyte enters into a chemical reaction at both the surface of a lithium anodic electrode element and also at the surface of a catalytic cathode electrode element. Moreover, cells of this type are known to provide a desirable and relatively high energy density battery arrangement.

In the cathode electrode for cells of this type, a catalytic material such as finely-divided carbon is disposed on an electrode substrate member where it provides the large surface areas that are desirable both for electrical conduction to the liquid electrolyte reactant materials and for locating reaction sites for the reactant materials. Parenthetically, it is notable that the useful life of finely-divided material cathode electrodes usually ends when the deposition of solid reactant products into the space between adjacent carbon particles and over the surface area of the carbon particles has proceeded until the effective surface area of the carbon is severely reduced. For this reason it is desirable to both provide a somewhat large amount of the carbon particles or other particulate material and to dispose this material on the electrode surface in a form which provides maximum particle accessibility to the liquid electrolyte—that is, in a form which is acceptable without use of the mechanical compaction which has been commonly used in the formation of such electrodes. Such disposition of the electrode particulate material is, however, in conflict with the need for small physical size in the electrode and high energy density performance of the electrolytic cell.

The patent art indicates a number of attempts to improve upon the arrangement of fine particle electrode structures; these attempts are evidenced by the patents cited below. It is significant to note, however, that notwithstanding these prior patent improvements, there has heretofore been a notable absence of an electrode arrangement wherein satisfactory uniformity of the small particle material and an electrode thickness that is small enough to be compatible with the high energy density and high power density needed for present-day state-of-the-art applications has been available.

The prior patent of one present invention co-inventor, Franz Goebel, U.S. Pat. No. 4,118,334, for example, describes a primary battery or electrochemical cell which employs a carbon black inclusive cathode element. The carbon black material of the '334 patent is prepared by a dried slurry crumbling process which results in the formation of cathode material globules. Each of the globules has minute pores for achieving electrolytic solution contact. The drying and crumbling to achieve globules of cathode material are, however, notable points of distinction between the present invention and teachings of the '334 patent.

Another physical arrangement and its associated processing of the carbon black material for a cathode structure is described in the patent of J. E. Barnes et al, U.S. Pat. No. 4,296, 187. wherein a wet carbon slurry material which includes a mixture of carbon black, water, and/or isopropyl alcohol together with a binder such as finely-divided TEFLON ® is rolled into a layer of predetermined thickness following its deposition onto a porous fiberglass substrate. The '187 patent also employs porous carbon globules, however, these globules are subjected to a plurality of rolling compaction steps. The carbon processing sequence including these rolling steps distinguishes the cathode processing of the present invention from the '187 patent.

Yet another electrochemical cell cathode arrangement which involves carbon black material is described in the patent of K. A. Klinedinst et al, U.S. Pat. No. 4,352,866, in which spraying of a liquid dispersion onto a substrate in a thin cathode structure is described. The '866 patent also involves a bonding material which may be a thermoplastic polymer, the use of water, ethanol, and isopropanol and an ultrasonic mixing of the dispersion components. The goal of achieving a thin cathode structure is pursued in several examples in the '866 patent, including example IV, wherein alternate spraying and drying onto a metallic foil such as a nickel foil of 127 micrometers thickness is described. The use of ultrasonic energy for the limited purpose of mixing liquid dispersion components is a principal distinction between teachings of the '866 patent and applicants' invention.

Another arrangement for manufacturing porous carbon structures is disclosed in the additional patent of Franz Goebel et al, U.S. Pat. No. 4,562,094, wherein a slurry of finely-divided carbon material is deposited on a substrate of stainless steel sheet, nickel screen, or woven or unwoven fiberglass materials with the slurry including a FREON (TF) ® or trichlorotrifluoroethane liquid. The '094 patent also utilizes a tetrafluoroethylene binder material and additionally includes a summary of the above-described Barnes et al patent. The present invention is distinguished over the '094 patent by the differing liquid vehicle material and the differing dispersion of slurry materials.

Despite the use of conventional spraying, thin foil substrates, tetrafluoroethylene binder materials, ultrasonic agitation of slurry component mixtures, multiple layered small particle films and other tangential similarities to the present invention in the above-described patents, the prior art has heretofore lacked an arrangement which fully achieves the processing and performance benefits of the present invention.

SUMMARY OF THE INVENTION

In the present invention, an ultra-thin electrode structure for an electrochemical cell such as a thionyl chloride cell is formed by disposing a fine particle slurry onto a selected substrate material. Ultrasonic energy aided spraying is employed in the dispersions to achieve an improved electrode surface and economical electrode fabrication. The ultrasonic energy assisted spraying provides a better controlled electrode surface and enables the formation of carbon particle cathode structures, for example, with desirable large carbon film thickness and relatively few sprayed-on layers.

An object of the present invention is therefore, to provide a high energy density and high power density cathode structure in an eletrochemical cell.

Another object of the present invention is to provide for improved fine particle films in an electrochemical cell electrode member.

Another object of the invention is to provide a particle slurry dispersion arrangement which achieves increased thickness in each dispersed slurry layer.

Another object of the invention is to provide a fine particle slurry dispersion arrangement in which the particles are disposed onto the substrate in a relatively dry condition in comparison with other arrangements.

Another object of the invention is to provide electrochemical cell electrode structures which have been exposed to fewer wet-to-dry cyclings in the formation sequence thereof and which therefore are of improved physical integrity.

Another object of the invention is to provide electrochemical cell electrode structures having desirable and uniform electrical characteristics.

Additional objects and features of the invention will be understood from the following description and the accompanying drawings.

These and other objects of the invention are achieved by disposing a mixture of finely-divided active carbon particles into a liquid slurry, generating from the carbon particle slurry a substrate member received fine mist spray, the generating step including dispersing said carbon particle liquid slurry from an ultrasonic energy excited spray apparatus, and heat treating the fine mist spray coated substrate member until a stabilized carbon particle film obtains.

DETAILED DESCRIPTION

Figure 1:
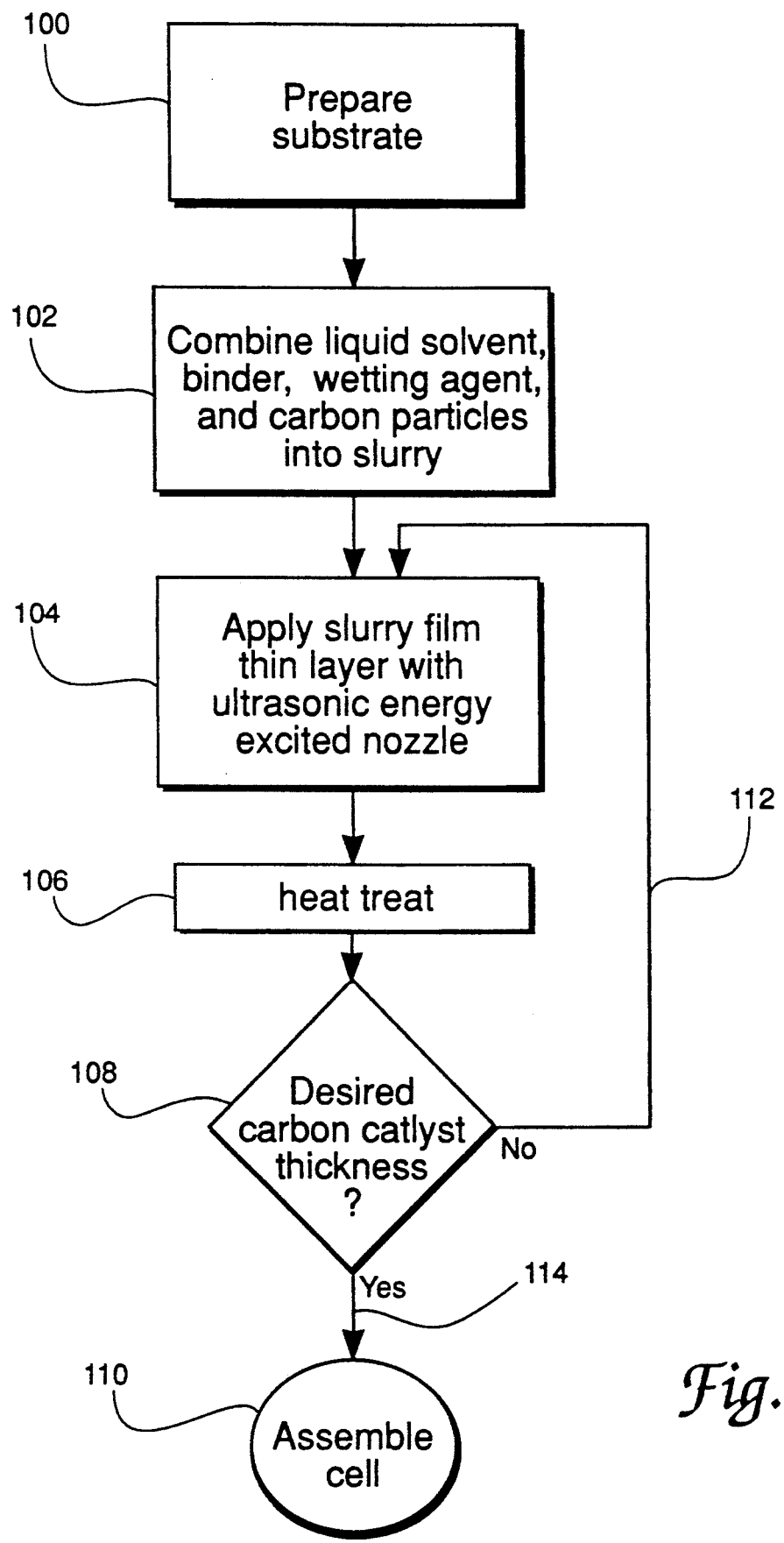
FIG. 1 shows an electrochemical cell cathode preparation sequence according to the invention.

FIG. 1 in the drawings shows a sequence of steps in accordance with the invention for fabricating an electrochemical cell electrode member: that is, for fabricating a carbon particle cathode for a thionyl chloride couple type of electrical battery cell, for example. The cathode electrode produced in accordance with the FIG. 1 sequence may be unusually thin and of improved uniformity and the described sequence for achieving such electrodes may be easily adapted to a high-volume production environment.

The FIG. 1 sequence first includes the preparation of a thin substrate member, as is indicated in the block 100. The substrate of block 100 may be a metallic foil or a grid of screen-like material and may be comprised of type 304 stainless steel or pure nickel 200 metal. The substrate alternately may be fabricated of a thin electrically insulating material which will be attached to the face of a metallic electrode member in a later sequence that is not shown in FIG. 1. Metal foil used in the step of block 100 may have a thickness of 0.0005 inch or greater, depending upon the physical size of the cell being fabricated. Generally thinner foils lead to a cathode structure which is more fragile and difficult to handle, but which is desirable for use in extremely weight or space-limited embodiments of the invention. The wire used in fabricating the screen mesh may be 0.003 inch or greater in diameter, also depending upon the cell space requirements. For use in the present invention, the surface of a metal foil substrate usually requires only a thorough cleaning.

The carbon particles which serve as a combination of catalyst, reaction site locators, and electrical charge conductors in an electrochemical cell cathode electrode are prepared for application to the substrate of block 100, in the manner indicated in the block 102 of FIG. 1. This preparation includes the mixing of carbon particles, a wetting agent material, and a binder material with a liquid solvent in order to form a liquid slurry suspension. This suspension is to be applied to the substrate of block 100 by way of a spray process as is indicated in the block 104 of FIG. 1. For the herein described cathode, the ingredients indicated in the block 102 may include a liquid solvent composed of 400 ml of deionized water and 100 ml of isopropanol. Into this solvent are mixed one gram of finely-divided tetrafluoroethylene fluorocarbon polymer (PTFE) binder material having a particle size in the range of $10^{-6}$ inch.

The carbon material to be added to the block 102 ingredients may be a mixture of 80% "Shawinigan Black" and 20% "Black Pearls" (2000) of 19 grams total weight. The "Shawinigan Black" carbon is sold by the Olefins Division of Chevron Corporation, Houston, TX in a 50% compressed form. The "Black Pearls" carbon is sold by Cabot Corporation located on Concord Road in Billerica, MA. The "Black Pearls" carbon is characterized by an especially large ratio of particle surface area to particle weight with the 2000 designation indication a nominal 2000 square meters of particle surface per gram of carbon. Both of these carbon materials are usually obtained by the incomplete combustion of a carbonaceous gas such as acetylene. The volumes and weights specified for the block 102 ingredients are, of course, for a laboratory sample embodiment of the carbon electrode structure and may be increased proportionally for larger sized embodiments of the invention or for large quantity use of the invention. The actual particle sizes to be expected in the "Shawinigan Black" and "Black Pearls" mixtures are not well defined by the manufacturers, but may be realistically characterized as particles which are measured in the micron range of physical size.

According to an alternate embodiment of the invention, the 100 ml of isopropanol and 400 ml deionized water recited in the FIG. 1 block 102 ingredients description may be replaced by an equal volume of ethylene glycol in order to achieve improved slurry spraying and film forming characteristics in the activity of block 104. Notably, the use of ethylene glycol in the block 102 solvent tends to improve the slurry and the electrochemical cell, since when the ethylene glycol solvent is used in place of water and isopropanol, the slurry remains more uniformly suspended and mixed during spraying. Thus, the sprayed carbon structure formed is more uniform in texture and thickness.

Application of the block 102 slurry to the block 100 substrate is indicated in the block 104 of FIG. 1. As indicated in this block 104, the application is preferably accomplished by use of an ultrasonic energy excited spraying apparatus such as the Model 8600-60 spray system manufactured by the Sono-Tek Corporation of Poughkeepsie, NY, 12601. The Sono-Tek spray apparatus is described in one or more of U.S. Pat. Nos. 3,861,852; 4,153,201; 4,301,968; 4,337,896; 4,352,459; 4,541,564; and 4,655,393, all of which are hereby incorporated by reference herein.

The addition of ultrasonic energy excitation to the block 102 spraying of slurry onto the substrate is found to offer notable advantages which are described below over coating arrangements used in prior electrode fabrication sequences. Generally, an ultrasonic energy assisted spraying apparatus operates by communicating the slurry or other material to be sprayed through a relatively large diameter channel to an atomizing surface, where it spreads out as a thin film. This thin film is then subjected to ultrasonic vibrational forces which cause it to breakup into a series of fine drops that are ejected from the atomizing surface as a spray. Spray apparatus of this type do not therefore rely on pressure for atomization, can be rate adjusted merely by controlling the amount of material reaching the atomizing surface, and can operate successfully on highly abrasive materials, slurries, and viscous mixtures.

The ultrasonic energy assisted application of carbon slurry material indicated in the block 104 is also preferably accomplished in a plurality of layers—however, a smaller number of layers are needed than with the conventional pressure driven spray apparatus. Each ultrasonic energy formed layer is also heat treated into a stable and dry condition as indicated in the block 106 prior to application of slurry for the next successive layer, however, since there are a smaller number of layers involved, a lesser number of heating cycles are required, and the compromised mechanical integrity and extreme porosity of a pressure sprayed electrode can be avoided.

In this ultrasonic energy sprayed slurry arrangement, the particles of a succeeding layer can be said to said to merge with the particles of a preceding layer in a matrix of interlocked and fungibly fused particles which are additionally stabilized by a heat treatment cycle. Preferably, each film layer applied in the block 104 has a thickness of 0.001 inch or less after the block 106 heat treatment. Total film thicknesses comprised of 10 layers and a thickness dimension of 0.005 inch are typical of the coatings used for the present electrode purposes. Additional details of the desired film thickness dimensions are disclosed herein in connection with the examples recited below.

The use of ultrasonic energy assisted spraying during application of finely-divided particle slurry to an electrode base or substrate member as employed herein is found to provide a particle deposition with several significant advantages over conventional arrangements for applying such materials. These advantages include:

1. The ability to apply thicker films during each layer of spray deposition. A 0.01 inch total coating thickness can be achieved with four or fewer layers when the ultrasonic energy assisted spraying of the present invention is used. Significant time and cost savings result from this shortened and simplified electrode formation arrangement.

2. Pressure energized venturi type nozzles are subject to clogging and frequent use difficulties. Such difficulties are absent or of significantly lower frequency with ultrasonic energy spray apparatus.

3. Pressure-venturi nozzles tend to propel the particles of a slurry with such velocity as to drive them into or through the more porous of the above-described thin substrate structures. The low velocity soft spray from an ultrasonic energy apparatus, however, avoids both this deep impregnation and the tendency of sprayed material to bounce back from the substrate.

4. Ultrasonic energy assisted spray deposition results in significantly less wetting of the previously applied film layers during application of a new film layer. Since each wetting and redrying of previously applied film layers causes an expansion-contraction cycle and promotes cracking in previously applied layers, ultrasonic energy assisted coatings have significantly better physical integrity than other spray applied coatings. Cracking, for example, limits the films formed with conventional spraying to 0.002 to 0.003 inch thickness per layer and a total thickness of about 0.005 inch. Ultrasonic energy assisted spraying can provide films of 0.01 inch or twice this previously attainable thickness, however.

5. Conventional pressure-venturi nozzles also require the use of many sprayed-on layers, often as many as 20 to 40 of such layers in order to achieve a cathode film of even 0.001 to 0.005 inch thickness. Such films involve a consequent large number of the spray/dry cycles in which early formed layers are rewetted and expanded. The resulting films are practically limited to a total thickness of 0.002 to 0.003 inch by a tendency to incur surface cracking and compromised mechanical integrity.

6. Carbon particle electrodes formed by conventional pressure-venturi spray apparatus are found to have a very open and porous nature and to be of 80 to 90 percent porosity. This characteristic is attributed to both the spray process itself and to the repeated wet/dry cycling involved in the building up of a film with plural sprayed layers. The ultrasonic energy assisted spraying of the FIG. 1 sequence, however, provides porosities of 70 to 85%. The resulting better electrical conductivity makes the electrodes formed by this process able to sustain higher cell discharge rates.

7. The slurries applied with ultrasonic energy assistance can be significantly thicker or more viscous in nature than are the slurries used in conventional venturi spray apparatus. The need for thinner, less viscous slurry consistency in conventional venturi spraying equipment is a major contributor to the undesired repeated rewetting of previously applied film layers. A thicker or more viscous slurry inherently provides more of the desired coating material in each unit volume of sprayed material and thereby contributes to the above-noted fewer film layers to achieve a given coating thickness. The tendency of an ultrasonic energy excited nozzle to atomize the received slurry into fine droplets is a significant contribution to the ability of such apparatus to accept and desirably deposit this more viscous slurry.

8. In an ultrasonic energy assisted spraying process each dispersed droplet of the slurry receives a sufficient quantum of the applied ultrasonic energy to incur a significant degree of drying during both its travel from the source conduit over the spray nozzle surface and in its travel to the coated workpiece and final deposition on the workpiece surface. Such droplet energization is also a contributor to the lower wetting of previously applied film layers with each new layer application.

Figure 2:
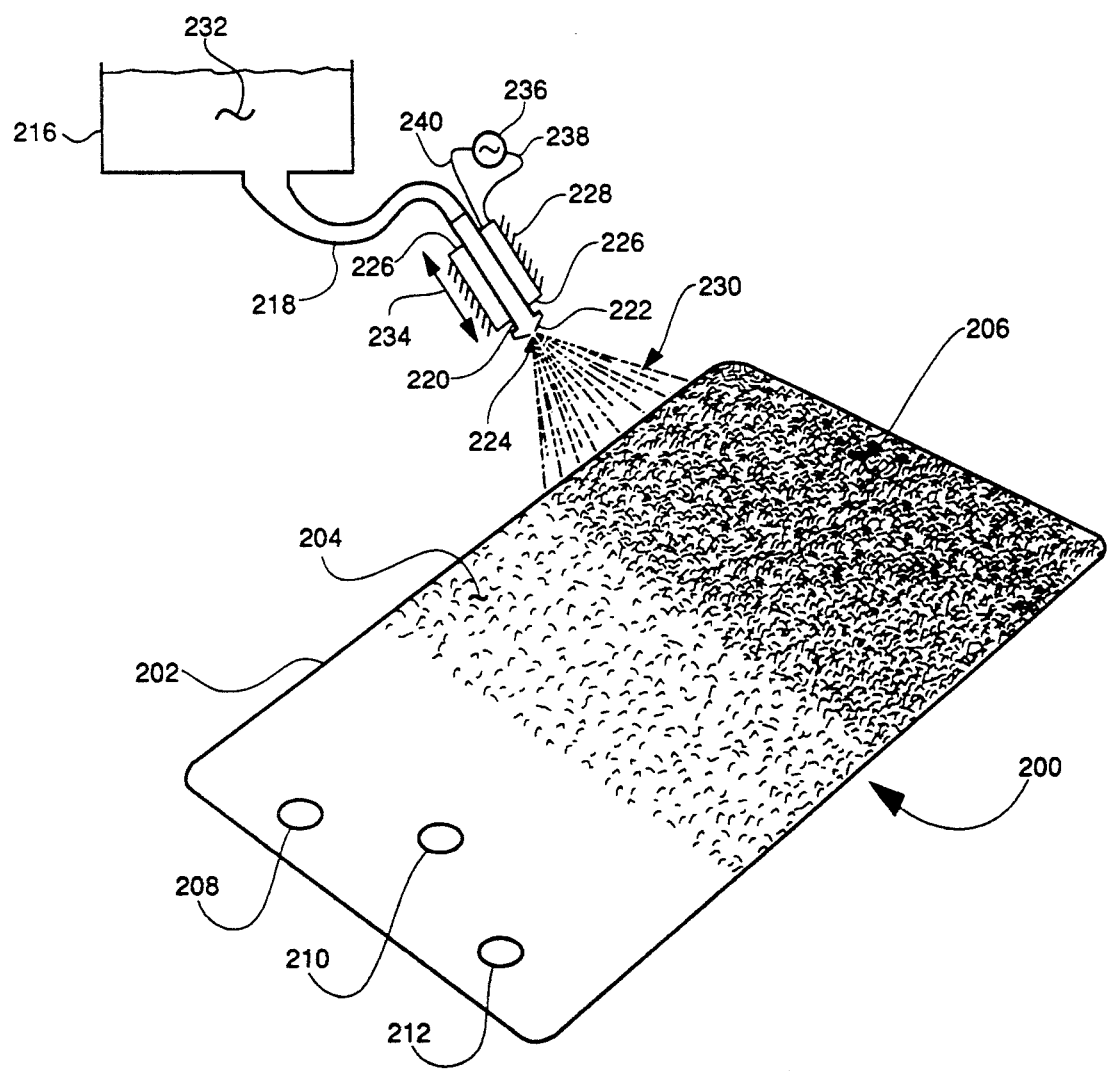
FIG. 2 shows the application of particle slurry to a substrate member.

9. Electrodes formed by an ultrasonic energy assisted spraying process can achieve the needed electrode high current density and energy density values with greater ease, since they do not require the physically disrupting particle and surface area reducing steps of electrode rolling or pressing—steps such as are described in the above referred-to U.S. Pat. No. 4,296,187.

10. By way of comparison, the generally accepted post deposition processing methods for electrochemical power electrodes, processing such as rolling a paste electrode or pressing a powder electrode are generally limited to the production of electrodes of approximately 0.01 inch and greater thicknesses. The FIG. 1 sequence, however, is found to be capable of producing carbon electrodes as thin as 0.0002 inch.

11. As a result of the drier spray droplets, the few film layers needed, the low spray mist velocity, and the other benefits from an ultrasonic energy assisted spraying process, the finely-divided solid material slurry can herein be satisfactorily deposited onto substrates which are difficult or impossible to successfully coat by other techniques. In the presently considered electrochemical cell art, for example, the ultrasonic spray coating of thin and fragile sheets such as matted glass fiber of 0.002 to 0.004 inch thickness, 0.003 inch thick PALLFLEX TM ceramic paper on a removable glass backing, microporous ceramic sheets of 0.001 inch to 0.002 inch thickness, TEFZEL TM sheet with microporous structure and thickness of 0.0015 inch and TEFLON® filled glass of 0.0015 inch thickness are all feasible.

For reasons of current density limitations, cost, porosity and substrate cutting difficulties, the glass fiber material in this group, especially the Hovosorb BG glass fiber manufactured by Hollingsworth and Vose Corporation, of East Walpole, Mass. is the most suitable of the non-metallic substrate materials recited above for use as a spray deposited separator member in cells made in accordance with the present invention.

As is described in the examples recited below herein, the heat treatment of block 106 in FIG. 1 may, in some instances, be limited to a solvent dissipation and drying sequence wherein temperatures below 300° C. are employed and only a limited degree of melting of the coating binders such as tetrafluoroethylene is achieved. In other instances, temperatures near 400° C., for example, are desired and a substantial degree of melting and fusion of the tetrafluoroethylene type binders is achieved. The former low temperature heat treatment may be fairly described as a drying operation, while the latter higher-temperature treatment is more to be considered a sintering operation.

The FIG. 1 ultrasonic energy assisted spraying application of thin layers with heat treatment of each layer to buildup the desired carbon particle thickness is continued in a repeating sequence until attainment of the desired carbon catalyst thickness is found during the decision made in block 108 in FIG. 1. Attainment of the desired thickness is indicated by a "yes" decision on the path 114 and the need for additional layers is indicated by a decision on the "no" path 112 from the decision of block 108 in FIG. 1. The "no" decision calls for application of an additional slurry film thin layer in the block 104, as is indicated by the flow path 112.

Assembly of the completed carbon film electrode into the battery cell or other electrochemical cell is indicated in the block 110 in FIG. 1. Incorporation of a plurality of the assembled cells into a multi-celled battery follows this cell assembly.

It is to be noted that assembly of the carbon film electrodes into a battery cell can involve the attachment of a fiber-coated porous separator onto the metallic electrode in the case where the film is first deposited onto a separator rather than onto the metallic electrode. Such separator to substrate attachment may be conveniently accomplished by pressing or rolling. The film deposited on a separator fabrication for a cell is found to be advantageous over film deposition directly onto a metallic foil member fabrication arrangement with the use of stainless steel foils. Stainless steel can form a resistive film detrimental to high rate discharge during heat curing of the sprayed carbon layer.

FIG. 2 in the drawings illustrates pictorially the application of slurry film to a substrate member in accordance with the block 104 of FIG. 1. In FIG. 2, the electrolytic cell cathode assembly 200 is shown to include a substrate member 202 which is covered with a first layer of carbon particles 204, and is undergoing the process of being covered with a second layer of carbon particles 206. The second layer of carbon particles 206 is being applied in the FIG. 2 representation by way of the spray mist 230 which originates in the spraying apparatus 214. The apparatus indicated at 214 generally represents the above-identified Sono-Tek Corporation ultrasonic spray equipment or similar apparatus that is available from other commercial sources.

Generally, the spraying apparatus 214 includes a nozzle portion which is provided with an atomizing surface 222 and an aperture 224 and which is connected to a slurry conveying capillary or conduit member 220. The combination of the conduit member 220 and the atomizing surface 222 are ultrasonically energized into the axially-directed ultrasonic movement indicated at 234 by way of an electrical-to-ultrasonic movement transducer member 226 which surrounds the conduit member 220. The transducer 226, which may comprise a piezoelectric crystal or other electrical-to-mechanical energy converting apparatus, is energized from a source of ultrasonic frequency electrical energy indicated at 236 by way of flexible tether conductors indicated at 238 and 240. Typically the source of ultrasonic energy 236 may operate in the 10 watts of output power range. The transducer 226 is arranged to provide physical displacement at ultrasonic frequencies, that is, the ultrasonic movement indicated at 234 with respect to some stationary or larger mass indicated at 228. Additional details regarding the arrangement of the ultrasonic spray apparatus are to be found in the above incorporated by reference patents of Sono-Tek Corporation and, in a Sono-Tek advertising brochure, copyright 1987, and published by Sono-Tek Corporation—which is also incorporated by reference herein.

The liquid slurry described earlier in connection with the block 102 in FIG. 1 is received in a vessel 216 in FIG. 2, and is connected with the conduit 220 by way of the flexible conduit 218, the vessel contained slurry is indicated at 232 in FIG. 2.

EXAMPLE I

In this example, a cathode prepared according to the above-described slurry composition is provided with a carbon particle coating having a thickness of 0.002 inches (after a two-hour sintering at 375° C.) and is immersed in an electrolyte of 1.2 molar lithium gallium chloride ($LiGaCl_4$) which also includes a 0.1 molar concentration of iodine ($I_2$) in a sulfuryl chloride ($SOCl_2$) solution. The carbon particle slurry fluid is of the above-described isopropanol type.

Figure 3:
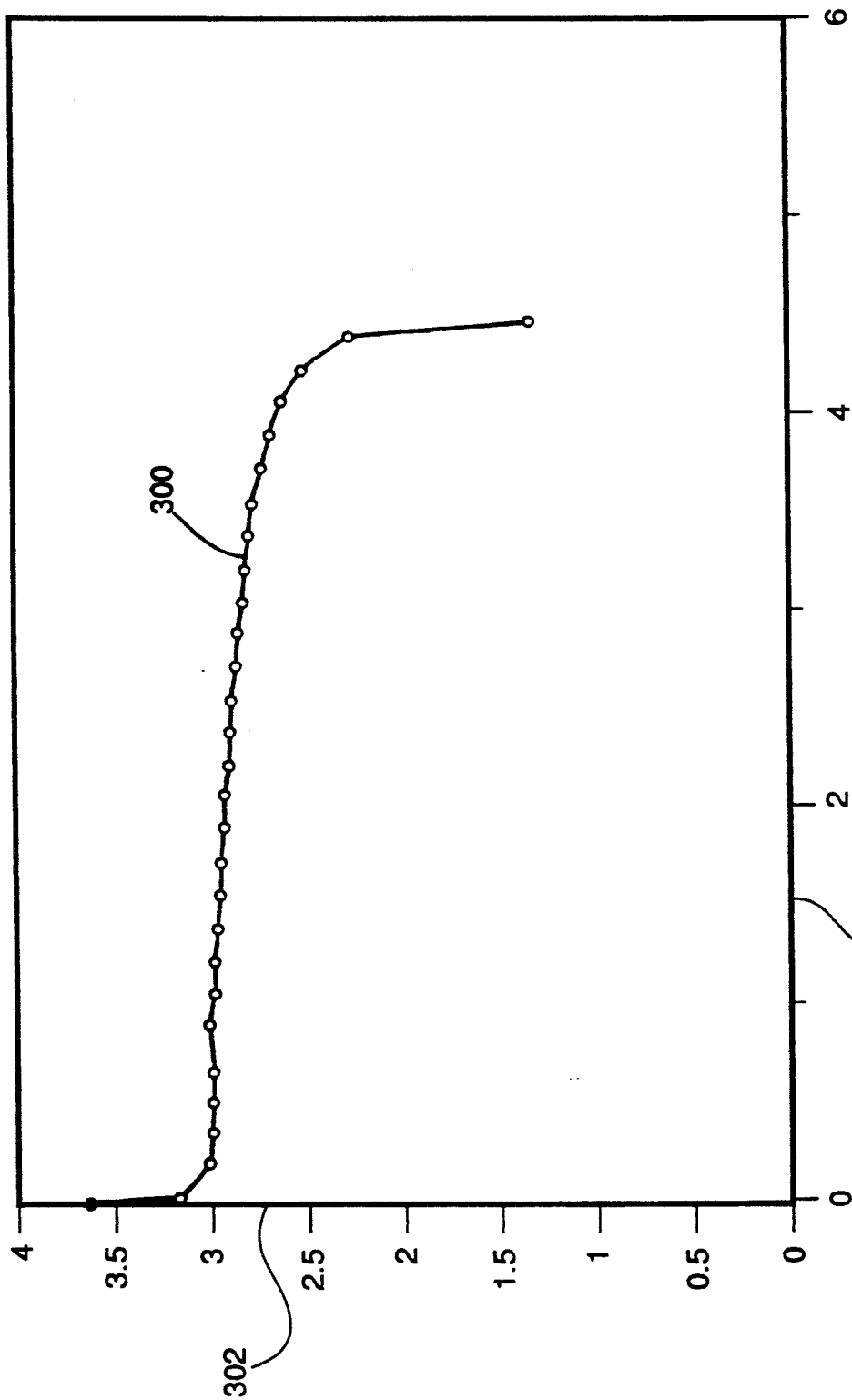
FIG. 3 shows the discharge characteristics of a battery cell which includes a cathode made in accordance with the invention.

The discharge characteristics for this cathode are shown in FIG. 3 of the drawings, where the axis 302 represents voltage across one cathode inclusive cell, the axis 304 represents discharge time in minutes, and the curve 300 indicates the cell discharge characteristics for a cathode which has an area of 62 square centimeters and with the discharge rate set at 50 milliamperes per square centimeter. The open circuit voltage of this example I cell is 3.6 volts, however, the lower FIG. 3 illustrated voltages are obtained under the stated loading. If the FIG. 3 curve is considered to have a 2.8 volt endpoint, then the example 1—FIG. 3 battery cell is shown to provide a capacity of 173 milliamp minutes per square centimeter and 0.57 ampere-hour per cubic centimeter at the 50 milliamperes per square centimeter discharge rate. Moreover, the average cell voltage to the 2.8 volts endpoint is 2.95 volts.

In comparison with a conventionally fabricated carbon particle electrode, an electrode prepared, for example, by rolling the carbon particle layer, the ultrasonic sprayed carbon film of the present invention provides an increase from 50 milliamp minutes per square centimeter to the above noted 173 milliamp minutes per square centimeter or 0.57 ampere hour per cubic centimeter capacity. It is to be noted that the 50 milliampere per square centimeter discharge rate described here is larger than the commonly-used 10 milliamperes per square centimeter rate and therefore tending to provide an unusually harsh comparison with normal cell capacities.

EXAMPLE II

In this example, a cathode prepared according to the above-described slurry composition is provided with a carbon particle coating having a thickness of 0.002 inches (after a thirty-minute drying at 275° C.) and is immersed in an electrolyte of 1.2 molar lithium gallium chloride ($LiGaCl_4$) which also includes a 0.1 molar concentration of iodine ($I_2$) in a sulfuryl chloride ($SOCl_2$) solution. The carbon particle slurry fluid is of the above-described isopropanol type.

Figure 4:
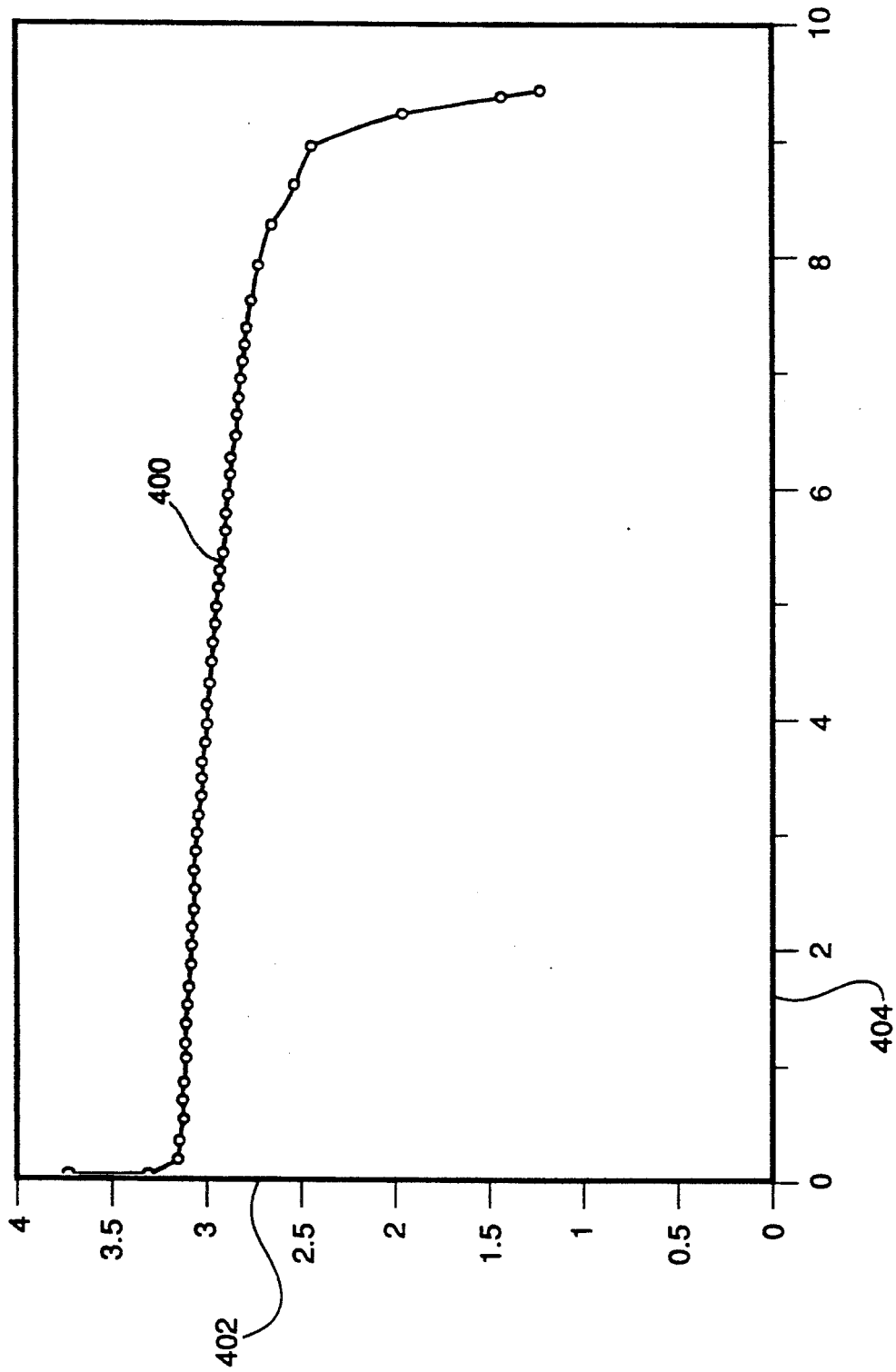
FIG. 4 shows the discharge characteristics of a second battery cell having a cathode made in accordance with the invention.

The discharge characteristics for this cathode are shown in FIG. 4 of the drawings, where the axis 402 represents voltage across one cathode inclusive cell, the axis 404 represents discharge time in minutes, and the curve 400 indicates the cell discharge characteristics when the cathode has an area of 62 square centimeters and the discharge is set at the previous 50 milliamperes per square centimeter rate. If the FIG. 4 curve is considered to have a 2.8 volt endpoint, the example I cathode which is included in the FIG. 4 battery cell is shown to provide a capacity of 356 milliamp minutes per square centimeter and 0.47 ampere-hour per cubic centimeter. In comparison with the example I cell, this example II cell has a significantly greater ampere-hour per unit area capacity—a result of the thicker carbon coating on the cathode and the larger endurance to the point of disabling carbon particle fouling. This cell is, however, characterized by a lower volumetric energy density as a result of the lower average carbon utilization over the full cathode thickness.

EXAMPLE III

In this example, a cathode prepared according to the above-described slurry composition is provided with a carbon particle coating having a thickness of 0.002 inches (after a thirty-minute drying at 275° C.) and is immersed in an electrolyte of 1.2 molar lithium gallium chloride ($LiGaCl_4$) which also includes a 0.1 molar concentration of iodine ($I_2$) in a sulfuryl chloride ($SOCl_2$) solution. The carbon particle slurry fluid is of the above-described ethylene glycol type. The discharge characteristics for this cathode are also shown in FIG. 4 of the drawings, where the axis 402 represents voltage across one cell, the axis 404 represents time in minutes, and the curve 400 indicates the cell discharge characteristics when the cathode has an area of 62 square centimeters and the discharge rate is set at 50 milliamperes per square centimeter. If the FIG. 4 curve is considered to have a 2.8 volt endpoint, the example III cathode which is included in this battery cell is shown to provide a capacity of 356 milliamp minutes per square centimeter and 0.47 amp/hour per cubic centimeter.

In the above-recited three examples, the electrode of example I provides a shorter discharge duration as a result of its thinner configuration and decreased carbon particle count. As noted earlier, reaction depositions occurring at the cathode carbon particle surface tend to obstruct the space between carbon particles and thereby diminish electrolyte access to the carbon particles, cell activity, and electrical performance.

Since the electrochemical potential of the herein-described electrolyte and cathode combination is fixed at the above-recited 3.6 volt level and since the maximum current density in an electrochemical cell is also physically limited by the kinetics of the chemistry used, improvement in the cell power density characteristics, that is, in the watts per liter capacity of the cell, can best be achieved by maximizing the electrode surface area employed within a given cell volume—as has been sought after in the above-described process and examples. A maximized surface area enables the achievement of maximum output current from a cell and results in the power density of the cell being limited by the thinness of the electrodes which can be manufactured and assembled into batteries. Since standard production methods such as rolling paste electrodes or pressing powder electrodes are inadequate for producing useful electrodes thinner than approximately 0.01 inch, the herein-described electrode arrangement wherein carbon electrodes as thin as 0.002 inch can be produced offers a significant advantage and enhancement of the electrochemical or battery cell art. Electrodes of the presently described type are found to be useful in the fabrication of lithium batteries capable of achieving energy densities in the range of 2 kilowatts per pound of weight and volume-to-energy ratios in the range of 0.7 cubic inches per kilowatt. Such batteries are frequently envisioned as possible energy sources for strategic defense initiative weapons.

The electrode production process of the present invention can also be used to obtain thin high rate electrodes that are composed of carbon mixed with cathode materials such as manganese dioxide ($MnO_2$) or titanium sulfide ($TiS_2$) or other metal oxides or sulfides used in lithium primary or rechargeable systems or alternately, in sodium anode batteries—where the active cathode material is applied directly to a ceramic separator element.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. A method of forming a high energy density thin carbon electrode for an electrochemical cell comprising the steps of:
    dispersing finely-divided active carbon particles into a liquid to form a slurry;
    directing a fine mist spray of said slurry onto a substrate using an ultrasonic energy excited spray apparatus; and
    heat treating said fine mist spray coated substrate member until a stabilized carbon particle film is obtained.

2. The method of claim 1 wherein said directing step includes coating said substrate member using plural layers of said fine mist spray.

3. The method of claim 2 wherein each of said layers has a post heat treatment thickness of one-half of one-thousandth of an inch.

4. The method of claim 1 wherein said carbon particles include a particle size in the one to one hundred micron size range.

5. The method of claim 1 wherein said directing step includes receiving said fine mist spray on a bare metal surface of said substrate member.

6. The method of claim 5 wherein said bare metal surface is comprised of metal selected from the group consisting of stainless steel and nickel.

7. The method of claim 1 wherein said substrate member is an electrically insulating electrode separator member and further including the step of attaching said separator member together with said fine mist spray received coating thereon to a metallic film electrode member.

8. The method of claim 1 wherein said liquid in said slurry includes a particle binding agent, a surface wetting agent and a liquid solvent.

9. The method of claim 6 wherein said liquid is selected from the group consisting of water and isopropanol.

10. The method of claim 6 wherein said liquid is further comprised of ethylene glycol.

11. The method of claim 8 wherein said dispersing step liquid slurry includes a polytetrafluoroethylene carbon particle binding agent.

12. The method of claim 1 wherein said directing of slurry from an ultrasonic energy excited spray apparatus includes transmitting said slurry via an ultrasonic energy energized capillary member to an atomizing surface of said spray apparatus.

13. The method of claim 8 wherein said heat treating step includes baking at a first temperature that is selected to dissipate said liquid solvent.

14. The method of claim 13 wherein said heat treating step includes baking at a second higher temperature, said baking including sintering of said particles.

15. The method of claim 1 wherein said carbon particles dispersed in said slurry include particles generated by an incomplete combustion of a carbonaceous gas.

16. An electrochemical cell electrode element produced by the process of:
    dispersing a mixture of finely-divided active carbon particles into a liquid to form a slurry;
    directing a fine mist spray of said slurry onto a substrate using an ultrasonic energy excited spray apparatus; and
    heat treating said fine mist spray coated substrate member until a stabilized carbon particle film is obtained.

17. The electrochemical cell electrode of claim 16 wherein said fine spray mist includes individual carbon particles of micron size together with multiple particle agglomerations of said carbon particles and also particles of a binder material.

18. The electrochemical cell electrode of claim 16 wherein said substrate member includes a metallic body composition selected from a materials group consisting of nickel and stainless steel, and a body structure taken from a formed metal structures group consisting of a porous mesh and a thin foil.

19. The electrochemical cell electrode of claim 16 wherein said liquid slurry includes liquids selected from the group consisting of water, isopropanol and ethylene glycol.

20. An electrochemical cell porous electrode member comprising the combination of:
    a planar base member of specified physical shape and dimension and at least one lateral extending surface;
    means including a first homogeneous layer film of micron sized particles produced by ultrasonic spray determined random dispersion over said base member lateral surface and in physical bonding therewith, with said first film layer having a first nominal thickness greater than one one-thousandth of an inch, for reacting with an electrolyte solution of said electrochemical cell;
    means including a second homogeneous layer film of micron sized articles produced by ultrasonic spray determined random dispersion over said first layer film and in physical bonding therewith;
    said second film layer also having a second nominal thickness greater than one one-thousandth of an inch.

21. The electrode member of claim 20 wherein said thin planar base member is comprised of metallic foil.

22. The electrode member of claim 20 further including a metallic foil substrate member and wherein said planar base member is comprised of an electrically insulating, chemically inert electrode separation material supported on a surface of said metallic foil member.

23. The electrode member of claim 21 further including a third homogeneous film of said micron sized particles produced by ultrasonic spray determined random dispersion over said second layer film in physical bonding therewith, said third film layer also having a third nominal thickness greater than one one-thousandth of an inch.

24. The electrode member of claim 20 wherein said micron sized particles are composed of material taken from the group consisting of finely-divided metal and finely-divided carbon.

25. The electrode member of claim 24 wherein said micron sized particles are composed of finely-divided carbon.

* * * * *